United States Patent
Tsutsui

[19]

[11] Patent Number: 5,930,750
[45] Date of Patent: Jul. 27, 1999

[54] ADAPTIVE SUBBAND SCALING METHOD AND APPARATUS FOR QUANTIZATION BIT ALLOCATION IN VARIABLE LENGTH PERCEPTUAL CODING

[75] Inventor: Kyoya Tsutsui, Kanagawa, Japan

[73] Assignee: Sony Corporation, Tokyo, Japan

[21] Appl. No.: 08/786,326

[22] Filed: Jan. 23, 1997

[30] Foreign Application Priority Data

Jan. 30, 1996 [JP] Japan .................................. 8-014523

[51] Int. Cl.$^6$ ............................ G10L 7/04; H04B 14/00
[52] U.S. Cl. .......................................... 704/229; 704/500
[58] Field of Search .................................. 704/229, 230, 704/500

[56] References Cited

U.S. PATENT DOCUMENTS

| | | | |
|---|---|---|---|
| 3,805,284 | 4/1974 | Coon, Jr. et al. | 360/15 |
| 4,184,049 | 1/1980 | Crochiere et al. | 704/229 |
| 4,809,274 | 2/1989 | Walker et al. | 371/37.02 |
| 4,896,362 | 1/1990 | Veldhuis et al. | 704/229 |
| 5,105,463 | 4/1992 | Veldhuis et al. | 704/501 |
| 5,109,417 | 4/1992 | Fielder et al. | 704/205 |
| 5,125,030 | 6/1992 | Nomura et al. | 704/222 |
| 5,142,656 | 8/1992 | Fielder et al. | 704/229 |
| 5,179,451 | 1/1993 | Takeshita et al. | 386/77 |
| 5,185,800 | 2/1993 | Mahieux | 704/500 |
| 5,264,846 | 11/1993 | Oikawa | 341/76 |
| 5,285,476 | 2/1994 | Akagiri et al. | 375/25 |
| 5,301,205 | 4/1994 | Tsutsui et al. | 375/200 |
| 5,311,561 | 5/1994 | Akagiri | 375/240 |
| 5,369,724 | 11/1994 | Lim | 704/206 |
| 5,375,189 | 12/1994 | Tsutsui | 704/229 |
| 5,381,143 | 1/1995 | Shimoyoshi et al. | 341/51 |

(List continued on next page.)

FOREIGN PATENT DOCUMENTS

| | | | |
|---|---|---|---|
| 0349325 A2 | 1/1990 | European Pat. Off. | G11B 20/10 |
| 0409248 A2 | 1/1991 | European Pat. Off. | H03M 7/30 |

OTHER PUBLICATIONS

J.P. Princen et al., "Subband/Transform Coding Using Filter Bank Designs Based On Time Domain Aliasing Cancellation," IEEE Apr. 6–9, 1987, pp. 2161–2164.

M.A. Krasner, "The Critical Band Coder—Digital Encoding of Speech Signals Based on the Perceptual Requirements of the Auditory System," IEEE Journal, Apr. 1980, pp. 327–331.

D.A. Huffman, "A Method for Construction of Minimum Redundancy Codes ,"Proc. I.R.E. vol. 40, No. 9, Sep. 1952, pp. 1098–1101.

J.H. Rothweiler, "Polyphase Quadrature Filters—A New Subband Coding Technique," ICASSP 83 Proceedings, IEEE International Conference on Acoustics, Speech & Signal Processing, Apr. 1983, vol. 3 of 3, pp. 1280–1283.

R.E. Crochiere et al., "Digital Coding of Speech in Sub–Bands," American Telephone and Telegraph Company, The Bell System Technical Journal, vol. 55, No. 8, Oct. 1976, pp. 1069–1085.

(List continued on next page.)

Primary Examiner—David R. Hudspeth
Assistant Examiner—Tálivaldis Ivars Šmits
Attorney, Agent, or Firm—Limbach & Limbach L.L.P.

[57] ABSTRACT

A signal encoding method for encoding input digital data by so-called high-efficiency encoding, wherein it is possible to suppress degradation in the sound quality in case of raising the compression ratio. The range of values of subband-based signal components for quantization to zero, to which a short codelength is given, is set so as to be larger. Consequently the ratio of the subband-based signal components quantized to values of a shorter codelength will become higher than if the subband-based signal components are quantized in such a manner as to minimize the total quantization error energy in each frequency band.

42 Claims, 14 Drawing Sheets

U.S. PATENT DOCUMENTS

| | | | |
|---|---|---|---|
| 5,414,795 | 5/1995 | Tsutsui et al. | 704/204 |
| 5,454,011 | 9/1995 | Shimoyoshi | 375/240 |
| 5,461,378 | 10/1995 | Shimoyoshi et al. | 341/51 |
| 5,471,558 | 11/1995 | Tsutsui | 704/219 |
| 5,490,130 | 2/1996 | Akagiri | 369/124 |
| 5,640,486 | 6/1997 | Lim | 704/206 |
| 5,717,821 | 2/1998 | Tsutsui et al. | 704/205 |
| 5,731,767 | 3/1998 | Tsutsui et al. | 341/50 |
| 5,737,718 | 4/1998 | Tsutsui | 704/205 |
| 5,754,127 | 5/1998 | Tsutsui et al. | 341/54 |
| 5,758,020 | 5/1998 | Tsutsui | 704/204 |
| 5,781,586 | 7/1998 | Tsutsui | 375/241 |

OTHER PUBLICATIONS

J.P. Princen et al., "Subband/Transform Coding Using Filter Bank Designs Based on Time Domain Aliasing Cancellation," IEEE, 1987, pp. 2161–2164.

R. Zelinski et al., "Adaptive Transform Coding of Speech Signals,"IEEE Transactions on Acoustics, Speech and Signal Processing, vol. ASSP–25, No. 4, Aug. 1977, pp. 299–309.

M.A. Krasner, "The Critical Band–Coder—Digital Encoding of Speech Signals Based on the Perceptual Requirements of the Auditory System," IEEE Journal, vol. 1–3, 1980, pp. 327–331.

U.S. application Ser. No. 08/491,948, Tsutsui et al., filed Jul. 18, 1995.

(A)

| m | CODES |
|---|---|
| -1 | 11 |
| 0 | 0 |
| 1 | 10 |

(B)

| m | CODES |
|---|---|
| -3 | 1111 |
| -2 | 1101 |
| -1 | 101 |
| 0 | 0 |
| 1 | 100 |
| 2 | 1100 |
| 3 | 1110 |

FIG.7

| SPECTRUM | (a) | (b) |
|---|---|---|
| s1 | 0 | 0 |
| s2 | +1 | +1 |
| s3 | -1 | 0 |
| s4 | -1 | -1 |
| s5 | +1 | +1 |
| s6 | 0 | 0 |
| s7 | -1 | -1 |
| s8 | +1 | 0 |

FIG.11

ADAPTIVE SUBBAND SCALING METHOD AND APPARATUS FOR QUANTIZATION BIT ALLOCATION IN VARIABLE LENGTH PERCEPTUAL CODING

BACKGROUND OF THE INVENTION

1. Field of the Invention

This invention relates to a signal encoding method for encoding input digital data by so-called high-efficiency encoding.

2. Description of the Related Art

A variety of high-efficiency encoding techniques exist for encoding audio or speech signals. Examples of these techniques include so-called transform coding as a blocking frequency splitting system of the blocking frequency spectrum splitting system (orthogonal transform) and a so-called sub-band coding system (SBC) as a non-blocking frequency spectrum splitting system. In the transform coding, audio signals on the time axis are blocked every pre-set time interval, the blocked time-domain signals are transformed into signals on the frequency axis, and the resulting frequency-domain signals are split into plural frequency bands and encoded from subband to subband. In the sub-band coding system, the audio signals on the time axis are split into plural frequency subbands and encoded without blocking. In a combination of the sub-band coding system and the transform coding system, the audio signals on the time axis are split into plural frequency subbands by sub-band coding system, and the resulting band-based signals are transformed into frequency-domain signals by orthogonal transform for encoding.

As band-splitting filters used in the sub-band coding system, there is a so-called quadrature mirror filter (QMF) discussed in R. E. Crochiere, "Digital Coding of Speech in Sub-bands", Bell Syst. Tech. J., Vol.55, No.8, 1976. This QMF filter divides the frequency spectrum in two subbands of equal bandwidths. With the QMF filter, so-called aliasing is not produced on subsequent synthesis of the band-split signals.

The technique of splitting the frequency spectrum is discussed in Joseph H. Rothweiler, Polyphase Quadrature Filters-A New Subband Coding Technique", ICASSP 83 BOSTON. With the polyphase quadrature filter, the signal can be split into plural frequency subbands of equal bandwidths.

Among the techniques for orthogonal transform, there is a technique in which the input audio signal is split into frames of a predetermined time duration and the resulting frames are processed by discrete Fourier transform (DFT), discrete cosine transform (DCT) or modified DCT (MDCT) to convert the signals from the time axis to the frequency axis. Discussions of a MDCT may be found in J. P. Princen and A. B. Bradley, "Subband/Transform Coding Using Filter Bank Based on Time Domain Aliasing Cancellation", ICASSP 1987.

If DFT or DCT is used as method for orthogonal transform of the waveform signal, and a transform is performed with time blocks each consisting of, for example, M sample data, M independent real-number data are obtained. Since M1 sample data are overlapped between neighboring time blocks for reducing connection distortion of time blocks, M real-number data are obtained on an average for (M-M1) sample data with DFT or DCT, so that these M real-number data are subsequently quantized and encoded.

If the above-described MDCT is used as the orthogonal transform method, M independent real-number data are obtained from 2M samples resulting from overlapping N sample data with both neighboring time blocks. That is, if MDCT is used, M real-number data are obtained from M sample data on an average. These M real-number data are subsequently quantized and encoded. In the decoding apparatus, waveform elements obtained on inverse transform in each block from the codes obtained using MDCT are summed together with interference for reconstructing waveform signals.

In general, if the time block for orthogonal transform is lengthened, frequency resolution is increased, such that the signal energy is concentrated in specified spectral signal components. Therefore, by employing MDCT in which a long time block length obtained by overlapping one-half of the sample data between neighboring time blocks is used for orthogonal transform, and in which the number of resulting spectral signal components is not increased as compared to the number of the original time-domain sample data, a higher encoding efficiency may be realized than if the DFT or DCT is used. If a sufficiently long overlap between neighboring time blocks is used, the connection distortion between time blocks of waveform signals can be reduced.

By quantizing signal components split from subband to subband by a filter or orthogonal transform, it becomes possible to control the subband subjected to quantization noise, thus enabling encoding with perceptually higher encoding efficiency by exploiting masking effects. By normalizing respective sample data with the maximum value of the absolute values of the signal components in each subband prior to quantization, a still higher encoding efficiency may be achieved.

It is preferable that the psychoacoustic characteristics of human beings are taken into account in determining the subband splitting width for quantizing the signal components resulting from splitting the frequency spectrum of the audio signals. That is, the frequency spectrum of the audio signals is divided into a plurality of, for example, 25, critical subbands. The width of the critical subbands increases with increasing frequency. In encoding the subband-based data in such case, bits are fixedly or adaptively allocated among the various critical subbands. For example, when applying adaptive bit allocation to the special coefficient data resulting from a MDCT, the spectra coefficient data generated by the MDCT within each of the critical subbands is quantized using an adaptively allocated number of bits. The following two techniques are known as the bit allocation technique.

In R. Zelinsky and P. Noll, "Adaptive transform Coding of Speech Signals", IEEE Transactions of Acoustics, Speech and Signal processing", vol. ASSP-25, August 1977, bit allocation is carried out on the basis of the amplitude of the signal in each critical subband. This technique produces a flat quantization spectrum and minimizes noise energy, but the noise level perceived by the listener is not optimum because the technique does not exploit the psychoacoustic masking effect.

In M. A. Krassener, "The Critical Band Coder-Digital Encoding of the Perceptual Requirements of the Auditory System", there is described a technique in which the psychoacoustic masking effect is used to determine a fixed bit allocation that produces the necessary bit allocation for each critical subband. However, with this technique, since the bit allocation is fixed, non-optimum results are obtained even for a strongly tonal signal such as a sine wave.

For overcoming this problem, it has been proposed to divide the bits that may be used for bit allocation into a fixed pattern allocation fixed for each small block and a bit allocation portion dependent on the amplitude of the signal in each block. The division ratio is set depending on a signal related to the input signal such that the division ratio for the fixed allocation pattern portion becomes higher the smoother the pattern of the signal spectrum.

With this method, if the audio signal has high energy concentration in a specified spectral signal component, as in the case of a sine wave, abundant bits are allocated to a block containing the signal spectral component for significantly improving the signal-to-noise ratio as a whole. In general, the hearing sense of the human being is highly sensitive to a signal having sharp spectral signal components, so that, if the signal-to-noise ratio is improved by using this method, not only the numerical values as measured can be improved, but also the audio signal as heard may be improved in quality.

Various other bit allocation methods have been proposed and the perceptual models have become refined, such that, if the encoder is of high ability, a perceptually higher encoding efficiency may be realized.

In these methods, it has been customary to find a real-number reference value of bit allocation whereby the signal to noise ratio as found by calculations will be realized as faithfully as possible and to use an integer approximate to this reference value as the allocated number of bits.

In the U.S. application Ser. No. 08/374,518, U.S. Pat. No. 5,717,821, as filed by the present Assignee, there is disclosed an encoding method in which a perceptually critical tonal component, that is a spectral signal component exhibiting signal energy concentration in the vicinity of a specified frequency, is separated from the spectral signal components, and encoded separately from other spectral components. This method enables audio signals to be encoded very efficiently without substantially producing perceptual deterioration of audio signals.

In constructing an actual codestring, it suffices to encode the quantization precision information and the normalization coefficient information with a predetermined number of bits for each subband designed for normalization and quantization and to encode the normalized and quantized spectral signal components.

In MPEG-1 audio, there is disclosed a high-efficiency encoding system in which the number of bits representing the quantization precision information will be different from subband to subband. Specifically, the number of bits representing the quantization precision information is set so as to be smaller with increasing frequency.

There is also known a method in which the quantization precision information is determined from, for example, the normalization coefficient information by a decoder without directly encoding the quantization precision information. Since the relation between the normalization coefficient information and the quantization precision information is set at the time of standard formulation, it becomes impossible to introduce quantization precision control based on an advanced perceptual model in future. In addition, if there is allowance in the compression ratio to be realized, it becomes necessary to set the relation between the normalization coefficient information and the quantization precision information from one compression ratio to another.

In D. A. Huffman, "A Method for Construction of Minimum Redundancy Codes", Proc. I.R.E., 40, p.1098 (1952), quantized spectral signal components are encoded more efficiently by encoding using variable length codes.

In the U.S. application Ser. No. 08/491,948, U.S. Pat. No. 5,778,339, filed by the present Assignee, it is proposed to adjust the normalization coefficients in case of using the variable length codes for more efficient encoding of the quantized spectral signal components with a smaller number of bits. With this method, there is no risk of significant signal dropout in a specified area in case of raising the compression ratio. In particular, there is no risk of dropout or appearance of specified subband signal components on the frame basis, thus avoiding the problem of generation of perceptually objectionable harsh noise.

However, if the conventional method is used for encoding with the aid of the above-described various encoding techniques, the number of processing steps is increased, such that it becomes difficult to encode the acoustic signals in a small apparatus in a real-time basis.

SUMMARY OF THE INVENTION

It is therefore an object of the present invention to provide a signal encoding method whereby wasteful signal quality degradation may be reduced.

According to the present invention, there is provided a signal encoding method in which the frequency spectrum of an input signal is split into a plurality of frequency subbands and respective signal components are quantized on the subband basis to generate quantized values which are encoded with variable length encoding. With this method, a larger range of respective subband-based signal components will be assigned a short codelength. Consequently, the ratio of the subband-based signal components being quantized to values of the shorter codelength will become higher than if the subband-based signal components are quantized in such a manner as to minimize the total quantization error energy in each frequency subband.

That is, the range of values quantized to a specified quantized value is varied for reducing wasteful degradation in sound quality.

BRIEF DESCRIPTION OF THE DRAWINGS

FIG. 7 shows a table for illustrating a typical encoding method.

FIG. 11 shows a table for illustrating the number of bits used for normalizing and quantizing the spectral signal components.

DESCRIPTION OF THE PREFERRED EMBODIMENTS

Figure 1:
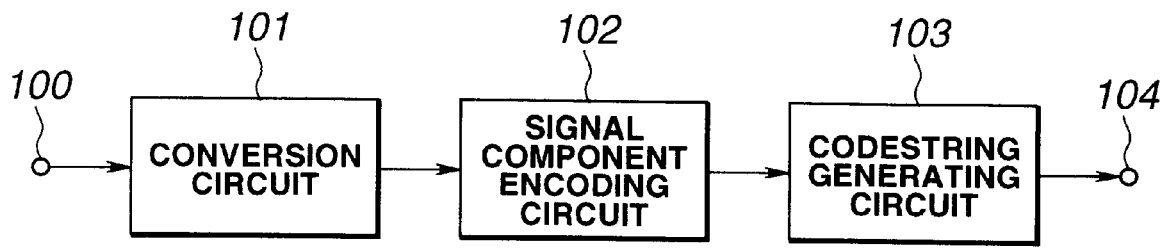
FIG. 1 is a block circuit diagram showing an illustrative structure of an encoder for carrying out the signal encoding method according to the present invention.

Referring to the drawings, preferred embodiments of the present invention will be explained in detail.

FIG. 1 shows, in a block diagram, an illustrative structure of an encoder (encoding apparatus) for encoding acoustic waveform signals according to the present invention.

In the structure of FIG. 1, an acoustic waveform signal entering an input terminal 100 is transformed by a transform circuit 101 into frequency signal components (spectral signal components) which are sent to a signal component encoding circuit 102 for encoding. The resulting encoded signals are sent to a codestring generating circuit 103 so as to be formed into a codestring which is outputted at an output terminal 104. The codestring outputted at the output terminal 104 is modulated by a pre-set method, after appendage of error correction codes thereto, so as to be then recorded on a recording medium, such as magnetic tape, or transmitted over a transmission medium, such as communication cable or electrical waves.

Figure 2:
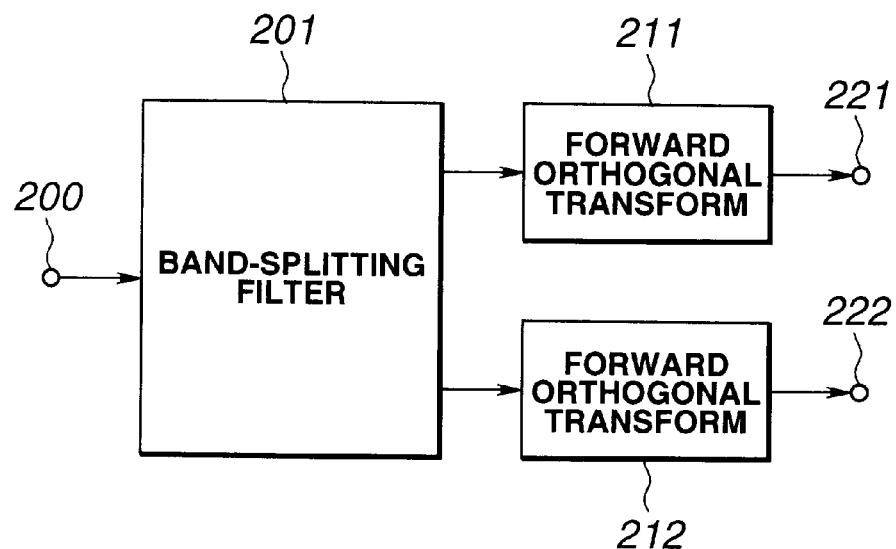
FIG. 2 is a block circuit diagram showing an illustrative structure of a conversion circuit of the encoder according to the present invention.

FIG. 2 shows an illustrative structure of the transform circuit 101 of FIG. 1. A signal entering a terminal 200 is split by a band-splitting filter 201 into two subbands. The resulting band-split signals are transformed into spectral signal components by forward orthogonal transform circuits 211, 212 performing orthogonal transform, such as MDCT. The input terminal 200 of FIG. 2 corresponds to the input terminal 100 of FIG. 1. The spectral signal components, outputted by the terminals 221, 222 of FIG. 2, are sent to the signal component encoding circuit 102 of FIG. 1. In the configuration of FIG. 2, the bandwidths of two signals outputted by the band-splitting filter 201 are one-half the bandwidth of the input signal at terminal 200, such that the signal outputted by the band-splitting filter 201 is decimated to one-half the input signal at terminal 200. Of course, the transform circuit 101 may be configured otherwise in addition to the configuration shown in FIG. 2. For example, the input signal may be directly transformed by MDCT into spectral signal components without splitting into subbands. Alternatively, the input signal may be transformed by DFT or DCT instead of by MDCT. Although the signal may be split into finer subband components by a band-splitting filter, the above-mentioned orthogonal transform is preferably used in the present invention since then a large number of frequency components may be obtained by a smaller processing volume.

Figure 3:
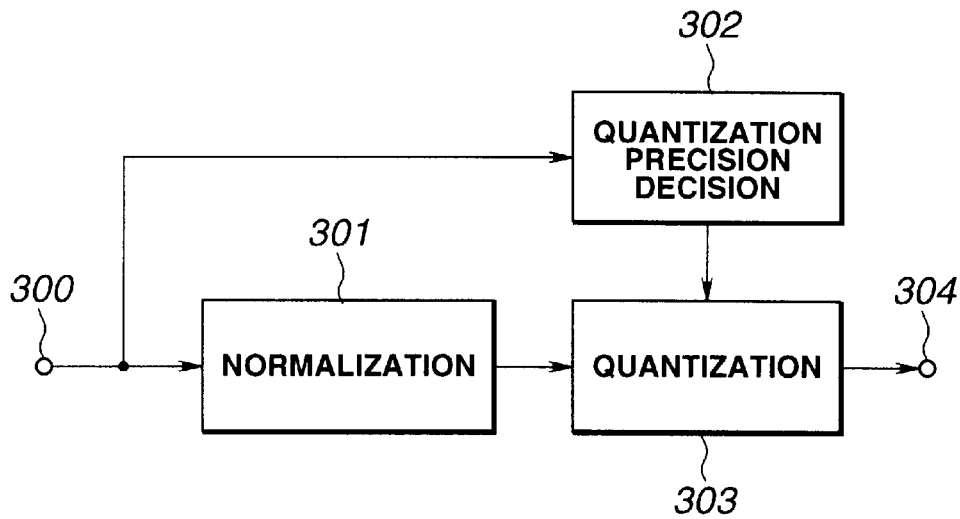
FIG. 3 is a block circuit diagram showing an illustrative structure of a signal component encoding circuit of the encoder according to the present invention.

FIG. 3 shows an illustrative structure of the signal component encoding circuit 102. The spectral signal components supplied to a terminal 300 are normalized by a normalizing circuit 301 from one pre-set subband to another and sent to a quantization precision decision circuit 303. The quantization precision decision circuit 303 quantizes the normalized values based on the quantization precision as computed from the spectral signal components. The spectral signal components, sent to the terminal 300 of FIG. 3, correspond to the output signal of the transform circuit 101 of FIG. 1, and becomes an input signal to the codestring generating circuit 103 of FIG. 1 outputted from a terminal 304 of FIG. 3. The output signal of terminal 304 of FIG. 3 contains the normalization coefficient information and quantization precision information, in addition to the quantized signal components (quantized values). Thus the normalization coefficient information and quantization precision information are processed, along with the codestring, so as to be recorded on the recording medium or transmitted over the transmission medium.

Figure 4:
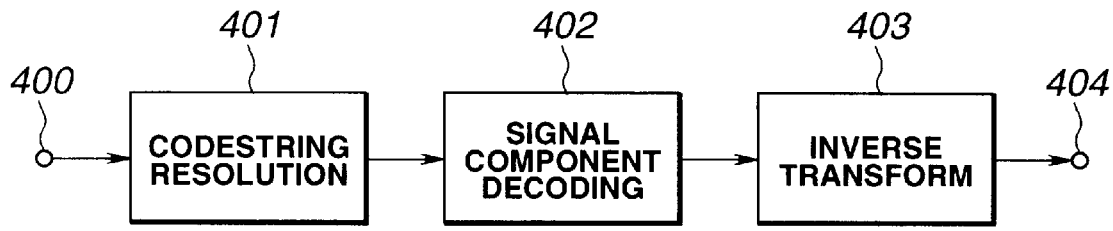
FIG. 4 is a block circuit diagram showing an illustrative structure of a decoder for carrying out decoding as a counterpart of encoding by the encoding method of the present invention.

FIG. 4 shows, in a block diagram, an illustrative structure of a decoder (decoding apparatus) for decoding acoustic signals from the codestring generated by the encoder of FIG. 1 and for outputting the decoded signal.

Referring to FIG. 4, the codestring recorded on the recording medium, reproduced, demodulated and corrected for errors, or the codestring transmitted over the transmission medium, demodulated and corrected for errors, is supplied to an input terminal 400. The codestring supplied to the input terminal 400 is sent to a codestring resolution circuit 401 in which the codes of the respective spectral signal components are extracted from the codestring and separated from the codes of the quantization precision information and the normalization coefficient information. These codes are sent to a signal component decoding circuit 402 which then decodes the respective spectral signal components using the quantization precision information and the normalization coefficient information. The decoded respective spectral signal components are processed by an inverse transform circuit 403 with an inverse transform which is the reverse of the orthogonal transform described above, so as to be thereby transformed into acoustic waveform signals which are outputted at an output terminal 404.

Figure 5:
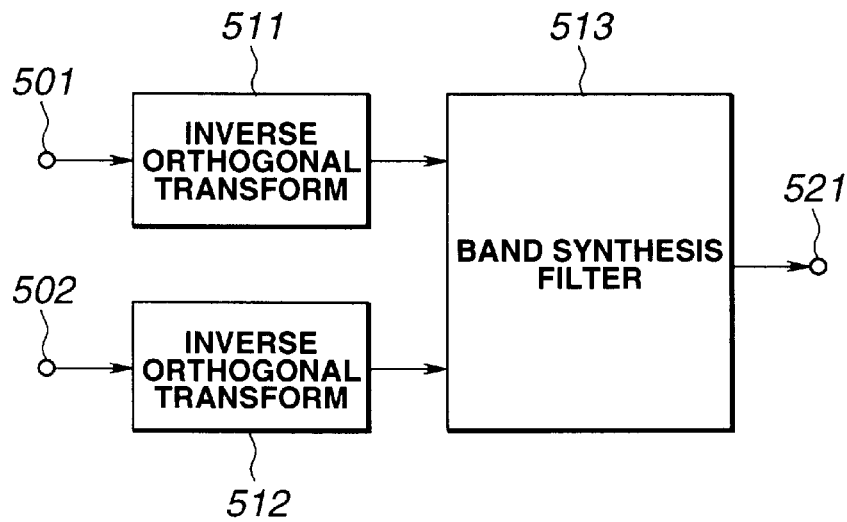
FIG. 5 is a block circuit diagram showing an illustrative structure of a back-conversion circuit of the decoder according to the present invention.

FIG. 5 shows an illustrative structure of the inverse transform circuit 403 of FIG. 4. This inverse transform circuit is a counterpart circuit of the transform circuit of FIG. 2, that is, the spectral signal components of the respective subbands, supplied to terminals 501, 502, are transformed by inverse orthogonal transform circuits 511, 512 associated with the respective frequency subbands, and the signals of the respective subbands are synthesized by a subband synthesis filter 513. Meanwhile, the signal components of the respective subbands, supplied to the terminals 501, 502, are outputs of the signal component decoding circuit 402, while an output of a terminal 521 is outputted at output terminal 404 of FIG. 4.

A typical signal encoding method in the above-described encoder of FIG. 1 is now explained.

Figure 6:
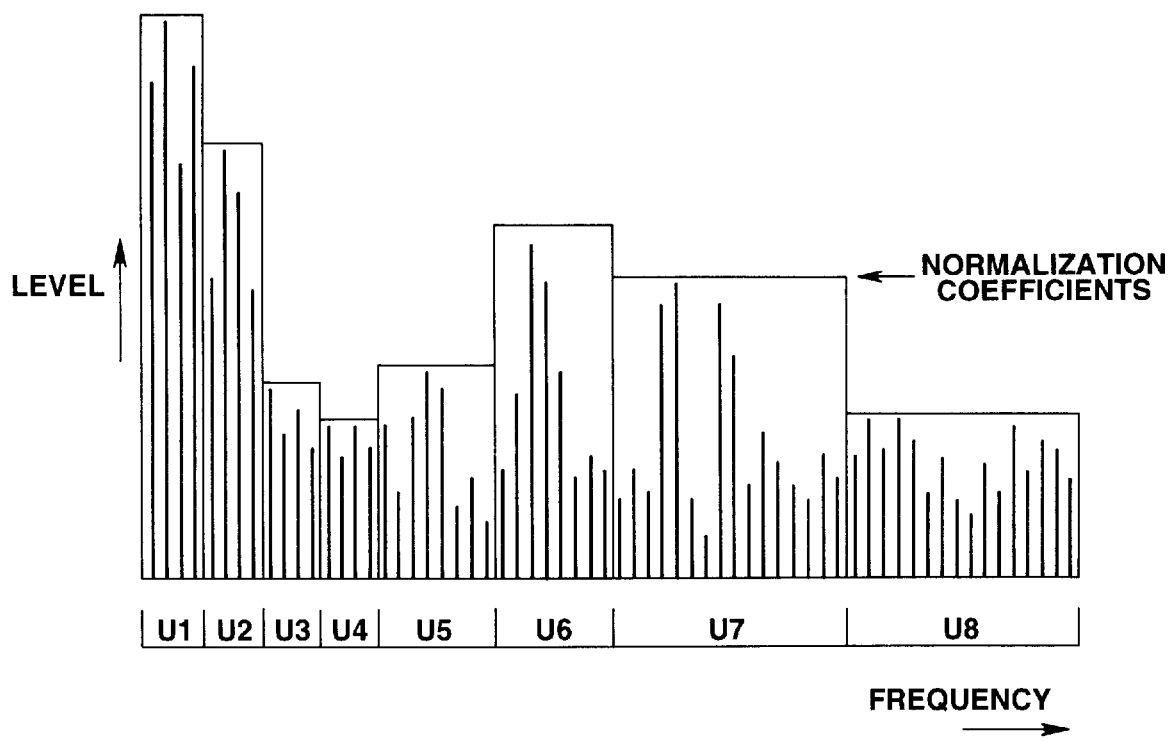
FIG. 6 illustrates an encoding unit.

FIG. 6 shows an example of spectral signal components obtained by MDCT processing by the transform circuit of FIG. 2. In this figure, the level of the absolute values of the spectral signal components obtained by MDCT is shown converted in dB.

Referring to FIG. 6, the waveform signal has been transformed into 64 spectral signal components every pre-set time block. These spectral component signals are grouped in terms of eight pre-set subbands U1 to U8 as units for normalization and quantization. These eight pre-set subbands are termed encoding units. That is, these encoding units serve as units for encoding. The bandwidths of the encoding units are selected to be narrower and broader in the low and high frequency ranges, respectively, for taking the psychoacoustic characteristics of the human being into account for controlling the generation of the quantization noise in a manner matched to the characteristics of the human hearing system. The quantization precision can be varied from one encoding unit to another depending on the manner of distribution of the frequency components for suppressing deterioration in the sound quality to the smallest value possible for achieving psychoacoustically efficient encoding.

For reducing the quantization error in the encoding units, the normalization coefficients in the encoding units are desirably set for approximating the maximum absolute value of the spectral signal components in the encoding units. For $0 \leq D \leq 63$, for example, the normalization coefficient is set as shown in the equation (1):

$$F = 2^{\frac{D-12}{3}} \qquad (1)$$

so as to be designated by 6-bit codes representing D. Also, for $0 \leq B \leq 15$, it may be designated as shown by the equation (2):

$$M = 2^B - 1 \qquad (2)$$

while a normalized quantized value m for a signal value (spectral signal component) v can assume an integer shown by the equation (3):

$$m(v, F, M) = \frac{v \times M}{F} \qquad (3)$$

The quantization precision can be designated by a 4-bit code representing B.

If the normalized quantized value m is represented by a variable length code, the encoding efficiency can be increased. In general, in a spectral distribution of audio signals, the signal energy is concentrated in many cases in specified frequency components. In such cases, the quantized values obtained on normalizing and quantizing the respective spectral signal components are mostly distributed in a range close to zero. Therefore, the encoding efficiency may be improved by setting shorter codelengths for quantized values close to zero. FIGS. 7(A), (B) illustrate examples of giving codes in setting the codelengths for B=1 and for B=2, respectively. If a signal is a tonal signal in which the signal energy is concentrated in specified frequency components, the quantization precision needs to be increased for such signal. The encoding efficiency is preferably increased for such signal for not degrading the sound quality.

Figure 8:
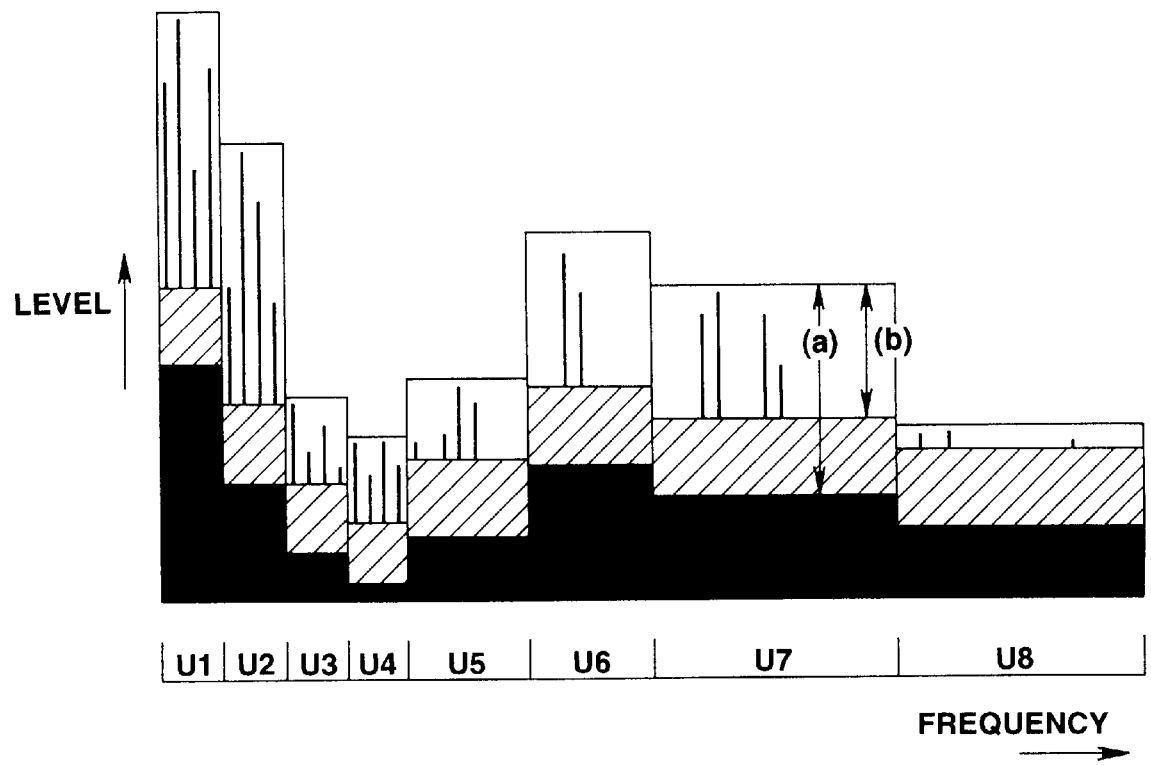
FIG. 8 illustrates typical setting for the initial value of quantization precision.

However, which quantization precision should be used in which encoding unit also differs with the signal compression ratio. FIG. 8 illustrates an example of a method for setting the quantization precision. In this figure, an area in black denotes an ideal allowable noise level as found by minimum audible level or masking calculations. Thus, in the encoding unit U7, for example, bit allocation which realizes a SN ratio shown at (a) leads to realization of the ideal sound quality. However, in fact, the number of bits which is more than is usable is required in many cases for realization of this SN ratio. Therefore, bit allocation obtained by uniformly decreasing the number of bits from the ideal allowable noise level, that is the bit allocation which will give the noise level shown shaded for the encoding unit U7, is actually performed for realization of the S/N ratio shown at (b) for the encoding unit U7.

Figure 9:
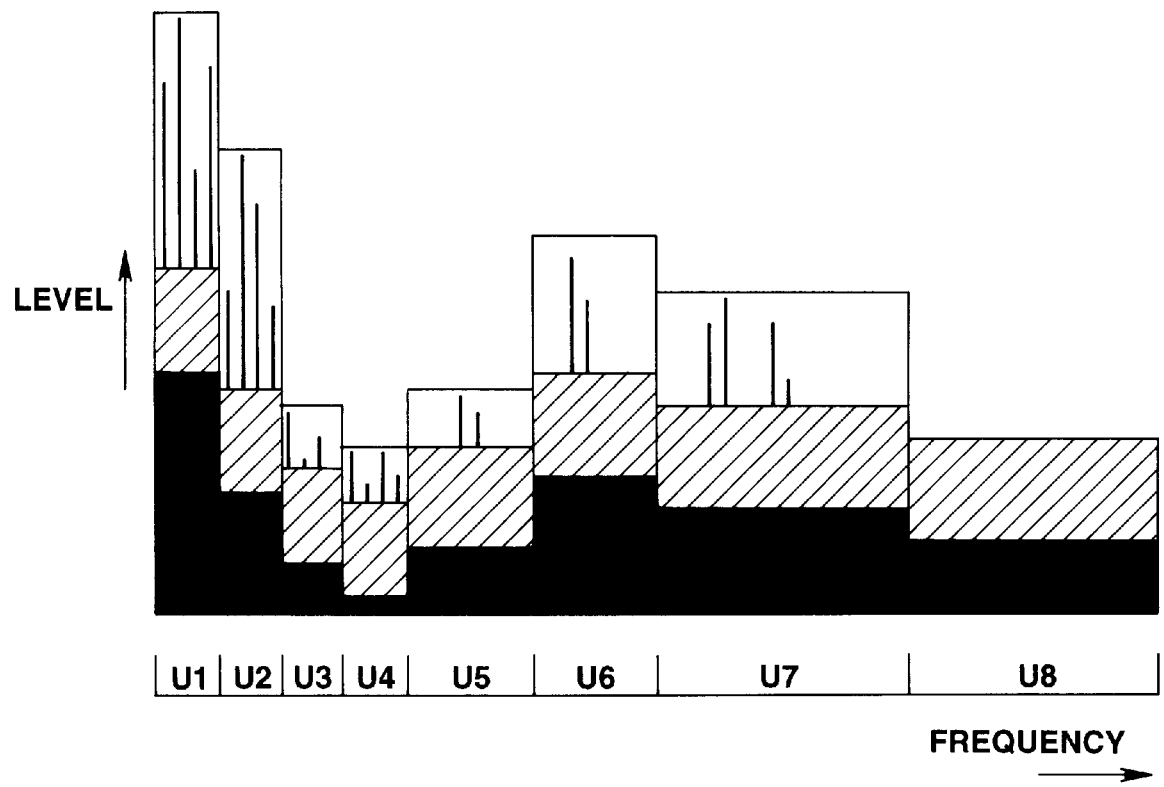
FIG. 9 illustrates bit allocation in case the compression ratio is raised further in setting the initial value of quantization precision.

FIG. 9 shows the manner of bit allocation for the case in which the compression ratio is increased further in the manner as shown in FIG. 8. In this case, no bits are allocated to the encoding unit U8. Such signal dropout for a specified subband leads to a significant problem in connection with the sound quality. In particular, if signal components in a specified subband appear or vanish depending on frames, the resulting sound becomes extremely harsh to the ear. Although it is possible to lower the quantization precision of other encoding units to allocate more bits to the encoding units in need of bits, depending on the state of bit allocation, it is difficult to cut the number of quantization steps significantly in case of a high compression ratio since then there is not a sufficient allowance of quantization precision in the other encoding units.

For overcoming this problem, there is proposed a method for minimizing the problem in connection with the human hearing system while minimizing the reduction of the number of quantization steps in performing the encoding using the variable length codes, as disclosed in the above-mentioned U.S. application Ser. No. 08/491,948.

Figure 10:
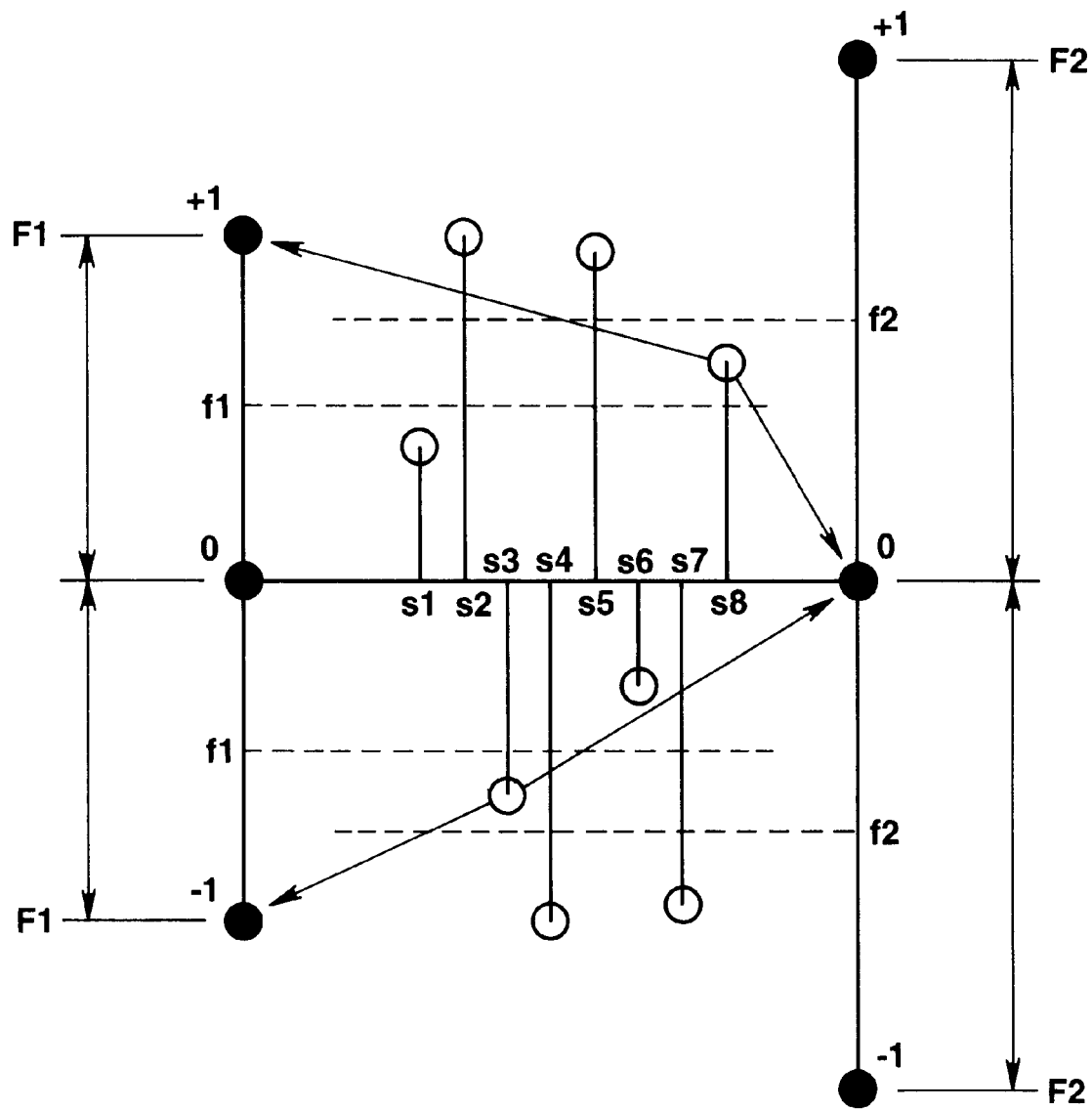
FIG. 10 illustrates how spectral signal components are normalized and quantized.

FIG. 10 illustrates an example of employing the method shown in the aforementioned U.S. application Ser. No. 08/491,948. In this figure, there is shown the manner of normalizing and quantizing spectral signal components s1 to s8. The column (a) in FIG. 11 shows the results obtained by normalizing the spectral signal components using the normalization coefficients having a value F1 shown towards left in FIG. 10 and by quantizing the normalized spectral signal components in three stages. The column (b) in FIG. 11 show the results obtained by normalizing the spectral signal components using the normalization coefficients having a value F2 shown towards right in FIG. 10 and by quantizing the normalized spectral signal components in three stages. That is, if the spectral signal components are normalized using the normalization coefficients having the value F1, the spectral signal components having the absolute values not larger than f1 in FIG. 10 are normalized to a value 0, while those having the absolute values larger than f1 are normalized to a value F1. On the other hand, if the spectral signal components are normalized using the normalization coefficients having the value F2, the spectral signal components having the absolute values not larger than f2 in FIG. 10 are normalized to a value 0, while those having the absolute values larger than f1 are normalized to a value F2. Therefore, if the spectral signal components are normalized using the normalization coefficients having the value F1, the spectral signal components s1, s2, s3, s4, s5, s6, s7 and s8 are normalized to 0, +1, −1, −1, +1, 0, −1 and +1, respectively, as shown at (a) in FIG. 11. On the other hand, if the spectral signal components are normalized using the normalization coefficients having the value F2, the spectral signal components s1, s2, s3, s4, s5, s6, s7 and s8 are normalized to 0, +1, 0, −1, +1, 0, −1 and 0, respectively, as shown at (b) in FIG. 11.

If encoding is done as shown in column (a) in FIG. 11, the signal components having the quantized values +1, 0 and −1 are decoded by the decoder to F1, 0 and −F1, respectively. On the other hand, if encoding is done as shown in column (b) in FIG. 11, the signal components having the quantized values +1, 0 and −1 are decoded by the decoder to F2, 0 and −F2, respectively. The difference between the original signal components and the encoded and decoded spectral signal components is smaller if the signal components are normalized and quantized as shown in column (a) than if the signal components are normalized and quantized as shown in column (b) in FIG. 11. However, if the normalized and quantized values are encoded by the encoding method shown in FIG. 7(A), the ratio of the small-length codes becomes larger if the signal components are normalized and quantized as shown in column (b) than if the signal components are normalized and quantized as shown in column (a) in FIG. 11.

Thus, if the compression ratio becomes extremely high such that the number of necessary bits is decreased, a reduction in the number of bits may be realized in the above-described signal encoding method by normalizing the signal components using the normalization coefficient having the value of F2 and subsequently encoding the normalized components as shown in column (b) in FIG. 11 rather than by normalizing the signal components using the normalization coefficients having the value of F1 and subsequently encoding the normalized components as shown in column (a) in FIG. 11. The result is that there is no risk of disappearance of the signal components of a special frequency band.

Figure 12:
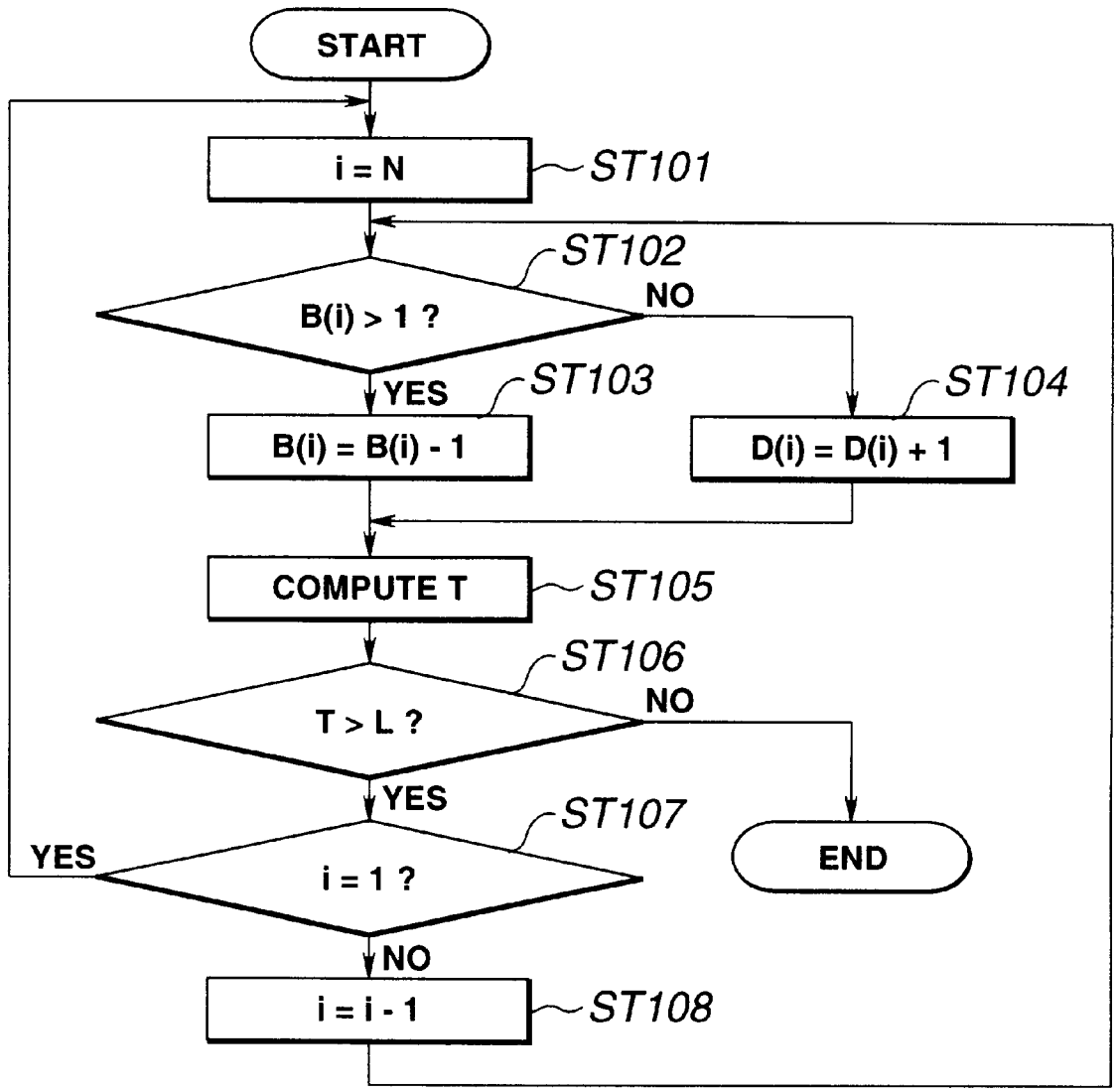
FIG. 12 is a flow diagram for illustrating processing flow for adjusting the number of bits used by varying the normalization coefficient.

FIG. 12 shows a typical processing in which the above-described method is applied to bit allocation adjustment. In this processing, only if, after a sufficient number of bits in view of the sound quality have been allocated by setting the normalization coefficients and carrying out masking calculations in accordance with the above-described method, the total number of bits used exceeds the number of available bits, the number of bits is suppressed to within a pre-set number of bits.

In the typical processing, shown in FIG. 12, N is the number of encoding units, B(i) is the bit precision designating ID in the i-th encoding unit, D(i) is the normalization coefficient designating ID in the i-th encoding unit, T is the total number of bits used for encoding, L is the number of bits available for encoding and the values of B and D are as defined in the above equations.

For starting the processing for reducing the total number of bits from a high range side (where inconveniences as concerns the acoustic sense are less likely to arise), the number i of the encoding unit is set at step ST101 as the number N of the encoding unit N (i=N). At step ST102, it is checked whether or not B(i) is larger than 1. If B(i) is larger than 1, processing transfers to step ST103 to decrement the number of quantization steps by one. If B(i) is not larger than 1, processing transfers to step ST103 to select a value larger by one as the normalization coefficient. Then, at step ST105, the total number of necessary bits T, is computed for the newly set normalization coefficient and quantization precision. At step ST106, the total number of bits T is compared to L, the number of bits available for encoding. If T is larger than L, processing transfers to step ST107 for further decreasing the total number of bits. If conversely T is not larger than L, the processing for reducing the total number of bits is terminated. At step ST107, it is checked whether or not the current encoding unit number i is 1. If the current encoding unit number i is 1, processing reverts to step ST101 to repeat the processing as from i=N. If the current encoding unit number i is not 1, the number of the encoding unit processed at step ST108 is decremented by one, after which processing transfers to step ST102 to continue the processing.

With the method of the present embodiment, the total number of necessary bits can be adjusted simply by varying the normalization coefficient, so that adjustment of the number of bits can be realized by a simplified encoder. In the present embodiment, the normalization coefficient is set to a larger value only for an encoding unit where the number of quantization steps cannot be decreased further. However, even in an encoding unit with a larger value of the number of quantization steps, the normalization coefficient can be set to a larger value instead of lowering the number of quantization steps.

If the normalization coefficient is set to a larger value, the quantization noise level in the encoding unit is increased. Thus, for preventing sound quality degradation, the variation in the normalization coefficient is preferably reduced to the smallest value possible.

To this end, the values that can be assumed by the normalization coefficient are adapted to be able to be set finely for an encoding unit where the normalization coefficient is varied for increasing the codes with shorter codelengths. As a method for realizing this, it is possible to change the value of a normalization coefficient to one given by the equation (4):

$$F = 2^{\frac{D+\frac{E}{2}-12}{3}} \qquad (4)$$

and to record the value of E only for an encoding unit which gives a larger value of the normalization coefficient, with the value of E being set to 0 for other encoding units.

In the above equation (4), E is the normalization coefficient refinement information specifying that the normalization coefficient has been set at finer steps.

Figure 13:
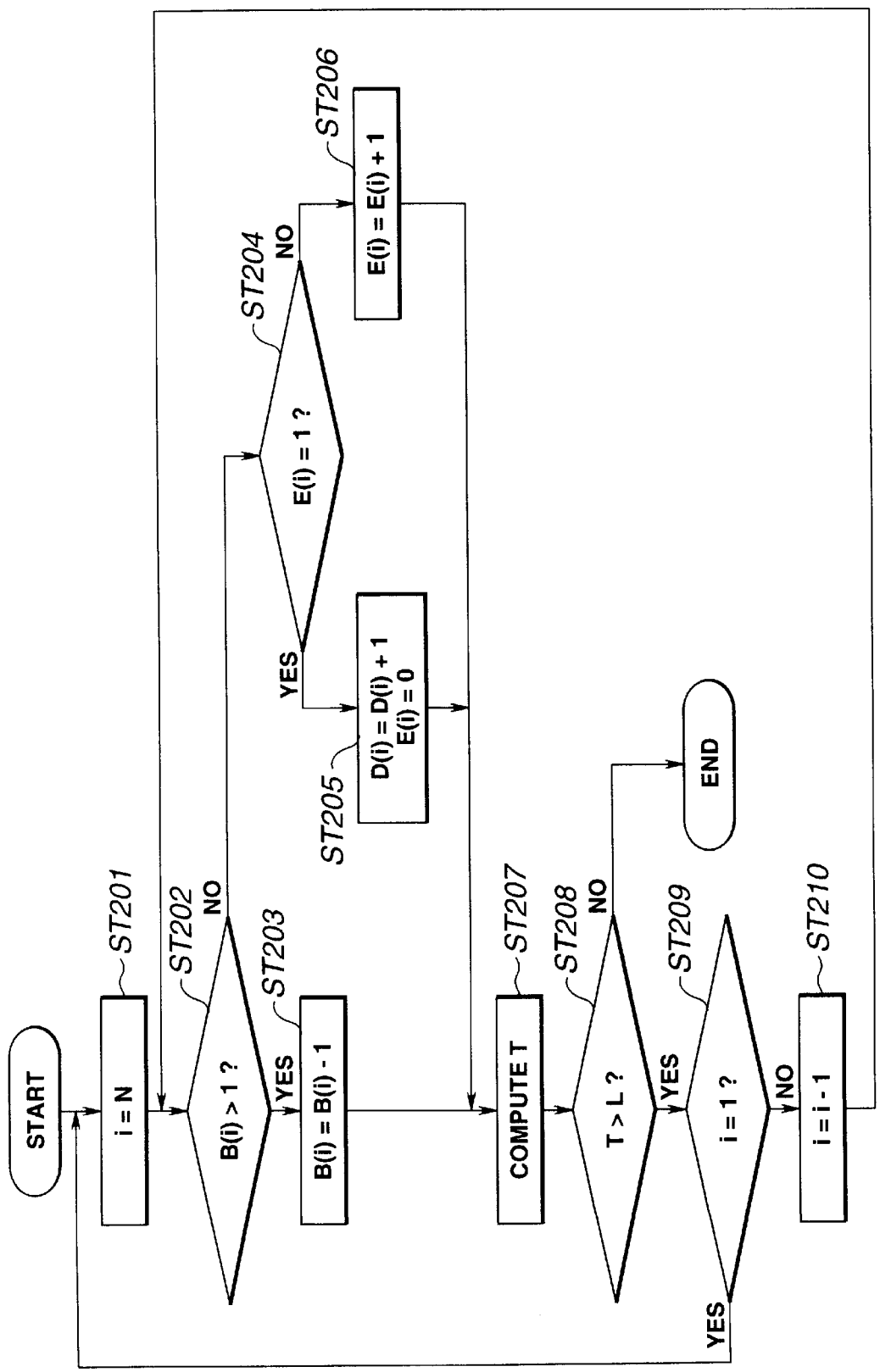
FIG. 13 is a flow diagram for illustrating processing flow for adjusting the number of bits in meeting with an upper limit of the number of bits that may be actually used in case the number of bits used exceeds the total numbed of available bits.

FIG. 13 illustrates a typical processing for carrying out the method of setting the normalization coefficient described above. In this processing, if the number of necessary bits, obtained as a result of the bit allocation, exceeds the total number of available bits, the number of necessary bits is adjusted for matching to the upper limit of the number of available bits. It is assumed that, prior to the start of the present processing, B(i) and D(i) are set for each encoding unit, while each E(i) is initialized at 0.

For starting the processing for reducing the total number of bits from a high range side (where inconveniences regarding the acoustic sense are less likely to arise), the number i of the encoding unit is set at step ST201 as the number N of the encoding unit N (i=N). At step ST202, it is checked whether or not B(i) is larger than 1. If B(i) is larger than 1, processing transfers to step ST203 to decrement the number of quantization steps by one. If B(i) is not larger than 1, processing transfers to step ST204 in order to check whether or not E(i) is equal to 1. If E(i) is equal to 1, processing transfers to step ST205 to increment D(i) by one and to set E(i) to 0 before processing proceeds to step ST207. If E(i) is not equal to 1, processing transfers to step ST206 to increment the value of E(i) by one before processing proceeds to step ST207. At step ST207, the total number of bits T is computed for the newly set normalization coefficient and quantization precision. At step ST208, the value of T is compared to the number of bits L available for encoding. If T is larger than L, processing transfers to step ST209 for further reducing the total number of bits. If T is not larger than L, the processing for reducing the total number of bits is terminated. At step ST209, it is checked whether or not the current encoding unit number i is equal to 1. If the current encoding unit number i is equal to 1, processing reverts to step ST201 to repeat the processing from i=N. If the current encoding unit number i is not equal to 1, the number of the encoding unit to be processed is decremented at step ST210 by one, processing then transfers to step ST202 to continue the processing.

Figure 14:
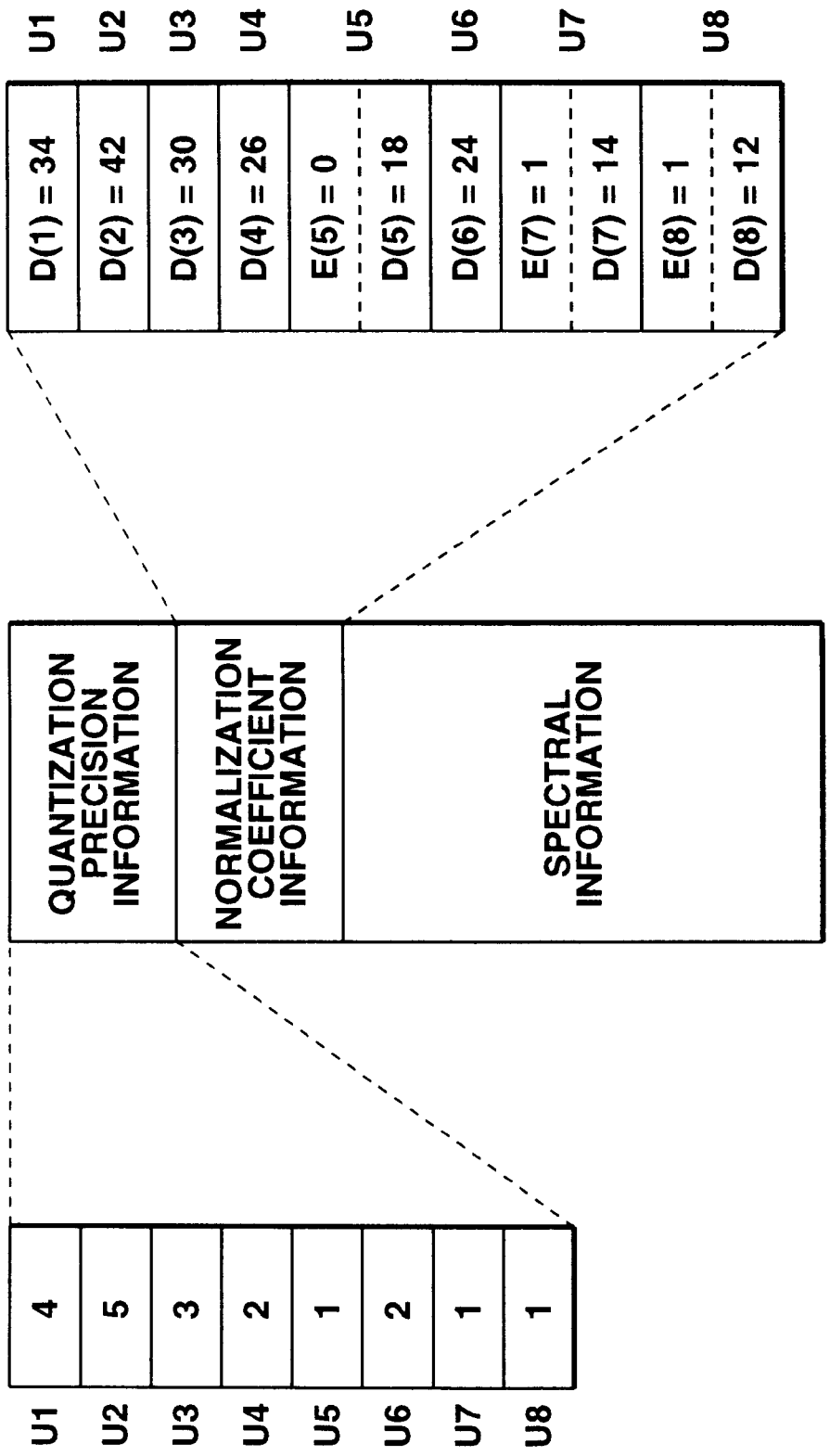
FIG. 14 illustrates an example of the method for recording a code obtained in accordance with the present invention.

FIG. 14 illustrates an example of the recording method for codes generated by the above-described method. In the present case, the normalization coefficient can be set to larger values only for an area for which the value of the quantization precision information B is equal to 1. In fact, the value of E is recorded only in such area.

Figure 15:
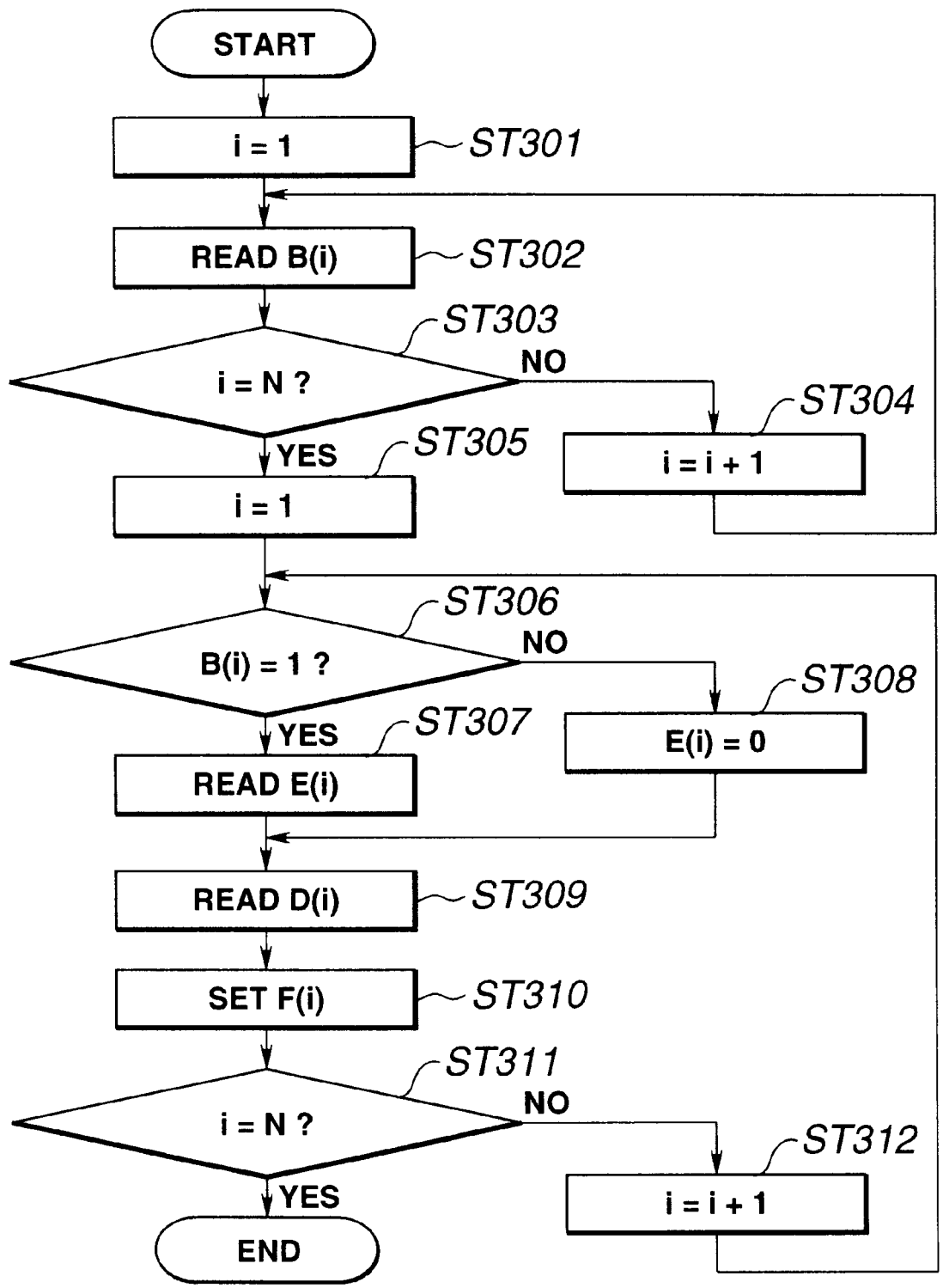
FIG. 15 is a flow diagram for illustrating an example of a method for recording codes obtained by the present invention.

FIG. 15 shows a typical processing flow for regenerating the quantization precision information and the normalization coefficient information from the information reproduced from a recording medium having recorded thereon the codes shown in FIG. 14. Although the quantization precision information prescribes the status of refinement of the normalization coefficient, it is of course possible to prepare other flag information data as the normalization coefficient refinement information.

Referring to FIG. 15, i is set to 1 (i=1) at step ST301. At step ST302, B(i) is read out. At step ST303, it is checked whether or not i=N. If i=N, processing transfers to step ST305 and, if i≠N, processing transfers to step ST304. At step ST304, i is set to i+1 after which processing reverts to step ST302. At step ST305, i is set to 1 (i=1) before processing proceeds to step ST306. At step ST306, it is checked whether or not B(i)=1. If B(i)=1, E(i) is read out at step ST308 and, if B(i)≠1, , E(i) is set to 0 (E(i)=0) at step ST308. At step ST309, D(i) is read out. At step ST310, F(i) is set. Then, at step ST310, it is checked whether or not i=N. If i≠N, i is set at step ST312 to i+1 (i=i+1). If i=N, processing is terminated.

Figure 16:
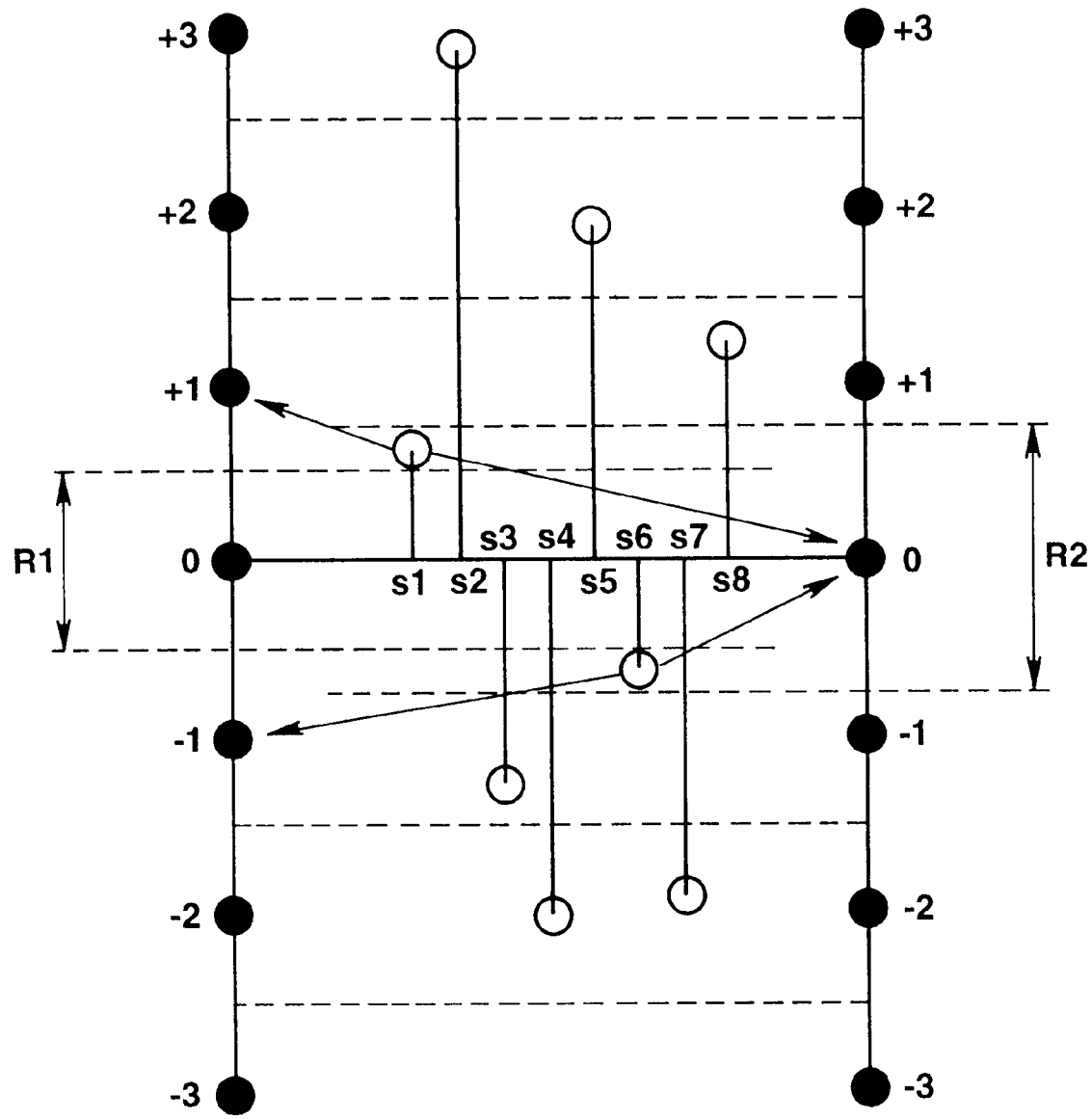
FIG. 16 illustrates a method for keeping the candidates of the spectral signal components that can be taken on encoding and decoding.

In the above-described embodiment, the candidates of the spectral signal components that can be taken in encoding and decoding are varied by modifying the normalization coefficient with respect to the candidates of the spectral signal components that can be taken on encoding and decoding without modifying the normalization coefficient. It is however possible not to vary these candidates. In FIG. 16, which is similar to FIG. 10, illustrates that the quantization method shown towards the left differs from that shown towards the right only with respect to the ranges R1 and R2 of values quantized to zero, to which is given a shorter codelength in the present embodiment. With the quantization method on the right-hand side of FIG. 16, employing R2 as a range of values quantized to zero as described above, the quantization noise in the encoding unit is increased, however, the ratio of the spectral signal components with the quantized value of zero with shorter codelength is increased, resulting in encoding with a smaller number of bits. In the method of the present embodiment, since the perceptually crucial spectral signal components of large amplitudes are decoded into the same spectral signal components as those in the case of minimizing the quantization noise, degradation in the sound quality can be suppressed to a minimum. With the present method, if there are available a sufficient number of available bits, it is desirable to minimize the quantization noise in each encoding unit. Therefore, the above processing is desirably carried out after the end of bit allocation for minimizing degradation in the sound quality.

Figure 17:
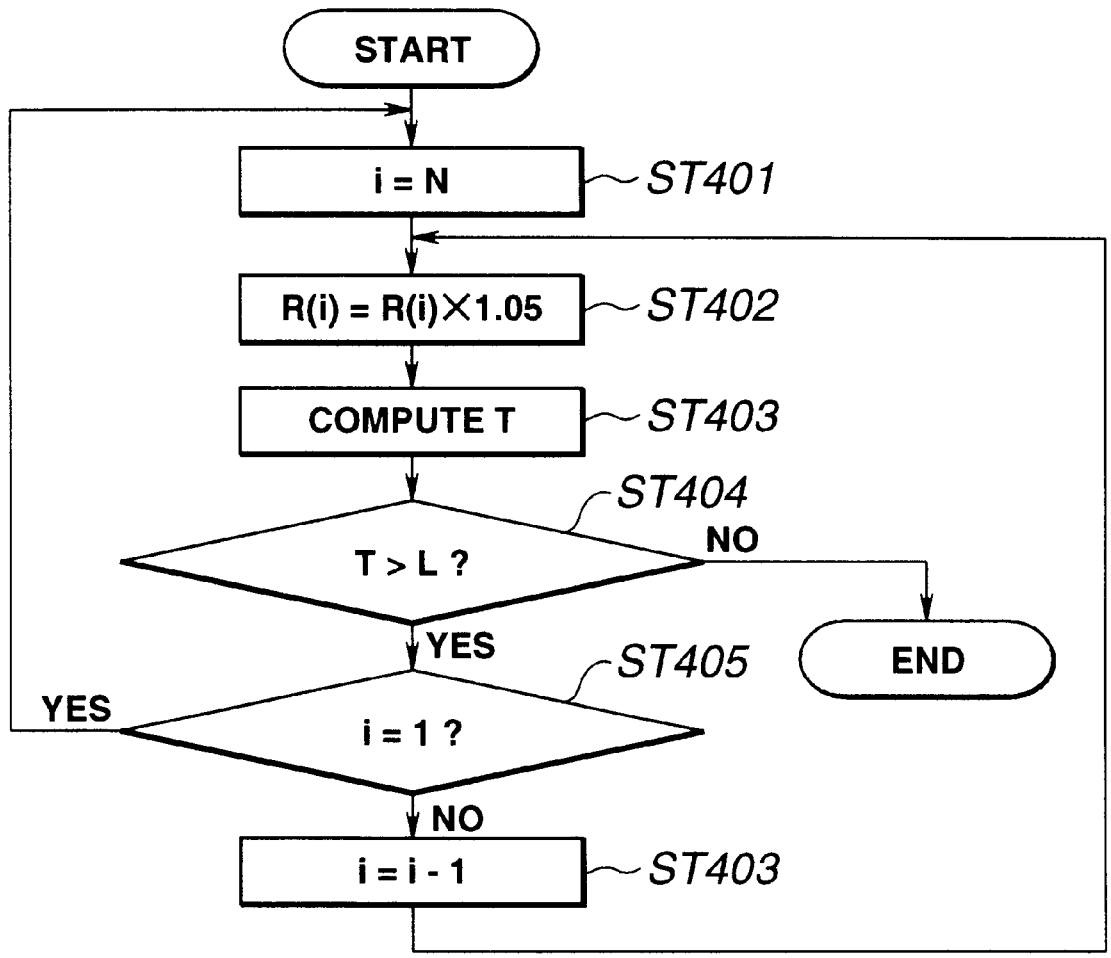
FIG. 17 is a flow diagram for illustrating the processing flow for carrying out the method for keeping the candidates of the spectral signal components that can be taken on encoding and decoding.

FIG. 17 illustrates a typical processing for the above-described method. This processing makes an adjustment to the upper limit of the number of bits that can be actually used if, as a result of bit allocation, the number of bits used exceeds the total number of usable bits.

For starting the processing for reducing the total number of bits from a high range side (where inconveniences as concerns the acoustic sense are less likely to arise) i is set at step ST401 to N (i=N). Then, at step ST402, the range (i) of quantization to zero, to which is given the short codelength in the instant embodiment, is enlarged. Then, at step ST403, the total number of bits T required with the use of the newly set quantization range is computed. At step ST404, this number T is compared to the total number of bits available for encoding L. If T is larger than L, processing transfers to step ST405 for further reducing the total number of bits. If T is not larger than L, processing for reducing the total number of bits is terminated. At step ST405, it is checked whether or not the current encoding unit number i is equal to 1. If the current encoding unit number i is equal to 1, processing reverts to step ST401 for repeating the processing as from i=N. If the current encoding unit number i is not equal to 1, the encoding unit number is decremented by one at step ST406 before processing proceeds to step ST402 to continue the processing.

On the present embodiment, the spectral signals are first normalized and subsequently quantized. However, with the method of the present invention, in quantizing the spectral signal components to a pre-set number of quantized values, the ratio of the band-based signal components being quantized to values of the shorter codelength is rendered to be higher than if the spectral signal components are quantized in such a manner as to produce the minimum quantization noise. Therefore, quantization need not necessarily be preceded by normalization. However, more efficient encoding may be realized by quantization preceded by normalization.

The foregoing description has been made of an illustrative structure employing signals filtered by a band-splitting filter and orthogonally transformed by MDCT, or signals inverse orthogonally transformed by inverse MDCT (IMDCT) as band-synthesizing means and subsequently filtered by a band-synthesis filter. Of course, the signals may be directly processed with MDCT or IMDCT without employing a band-splitting filter or a band-synthesis filter. The orthogonal transform may also be DFT or DCT in place of MDCT. The subband splitting or subband synthesis may also be made by a band-splitting filter or a band-synthesis filter instead by orthogonal transform. Although the foregoing description has been made of the case of using an acoustic waveform signals, the method of the present invention may also be applied to other sorts of signals, such as, for example, video signals. However, if the audio signals are orthogonally transformed, such as MDCTed, to provide a signal converted into a large number of spectral signal components, for processing by the method of the present invention, the method of the present invention may be applied most efficiently since crucial signals are then concentrated in specified frequencies and encoding of the variable length codes or the tonal signal components raises the encoding efficiency.

It is to be noted that the method of the present invention is applicable not only to the case of recoding the encoded information on the recording medium, but also to the case of transmitting the information.

What is claimed is:

1. A signal encoding method comprising the steps of:

transforming an input signal to a frequency spectrum of signal components;

splitting the signal components of the frequency spectrum into a plurality of frequency subbands;

quantizing the signal components in each subband to generate quantized values;

determining the quantization precision needed for the signal components of each subband, wherein the quantization precision is determined to be higher where the quantized values are larger and lower where the quantized values are smaller; and encoding the quantized values in variable-length codes, wherein the code lengths are set to be longer if the quantization precision value is higher, and shorter if the quantization precision value is lower.

2. The signal encoding method of claim 1, further comprising the steps of:

calculating a total number of bits necessary for minimizing the total quantization error energy in each subband;

comparing the total number of bits necessary for minimizing the total quantization energy in each subband to a total number of available bits; and setting a range of subband-based signal components which have a short codelength to be larger than if the subband-based signal components are quantized in such a manner as to reduce the total quantization error energy in each frequency subband only if the total number of bits necessary for minimizing the total quantization energy in each subband is larger than the total number of available bits.

3. The signal encoding method of claim 1 further comprising the steps of:

selecting a normalizing coefficient; and prior to the step of quantizing, normalizing the signal components of each subband.

4. The signal encoding method of claim 3, wherein the normalization coefficient of the normalizing step approximates the maximum absolute value of the spectral signal component of each subband.

5. The signal encoding method of claim 3, wherein the steps of normalizing, quantizing, determining quantization precision and encoding begin in a highest-frequency subband.

6. The signal encoding method of claim 1, wherein the signal components are spectral signal components obtained by converting the input signal from the time domain to the frequency domain.

7. The signal encoding method of claim 1, wherein the input signal is an acoustic signal.

8. The signal encoding method of claim 7, wherein the frequency subbands have been selected to be narrower in the low frequency ranges and broader in the high frequency ranges, to take into account the psychoacoustic characteristics of human hearing.

9. The signal encoding method of claim 1, wherein the encoding method produces a higher ratio of shorter to longer codelengths than if the subband-based signal components are quantized in such a manner as to minimize the total quantization error energy in each subband.

10. A recording medium having encoded signals recorded thereon, the encoded signals operative to control, in part, the operation of a decoding apparatus, the recording medium being prepared by the steps of:

transforming an input signal to a frequency spectrum of signal components;

splitting the signal components of the frequency spectrum into a plurality of frequency subbands:

quantizing the signal components in each subband to generate quantized values;

determining the quantization precision needed for the signal components of each subband, wherein the quantization precision is determined to be higher where the quantized values are larger and lower where the quantized values are smaller;

encoding the quantized values in variable-length codes, wherein the code lengths are set to be longer if the quantization precision value is higher, and shorter if the quantization precision value is lower; and recording the encoded quantized values onto the recording medium.

11. The recording medium of claim 10, wherein the process of preparing the recording medium further comprises the steps of:

calculating the total number of bits necessary for minimizing the total quantization error energy in each subband;

comparing the total number of bits necessary for minimizing the total quantization error energy in each subband to the total number of available bits; and setting the range of subband-based signal components which have a short code length to be larger than if the subband-based signal components are quantized in such a manner as to reduce the total quantization error energy in each frequency subband only if the total number of bits necessary for minimizing the total quantization error energy in each subband is larger than the total number of available bits.

12. The recording medium of claim 10, wherein the process of preparing the recording medium further comprises the steps of:

selecting a normalizing coefficient; and prior to the step of quantizing, normalizing the signal components of each subband.

13. The recording medium of claim 12, wherein the steps of normalizing, quantizing, determining quantization precision and encoding begin in a highest-frequency subband.

14. The recording medium of claim 10, wherein the signal components are spectral signal components obtained by converting the input signal from the time domain to the frequency domain.

15. An encoded data signal recorded on a recording medium, the encoded data signal comprising:

quantized values of signal components in a plurality of frequency subbands of a frequency spectrum;

quantization precision values for the signal components of each subband, wherein the quantization precision is higher where the quantized values are larger and lower where the quantized values are smaller; and variable-length codes, wherein the code lengths are longer if the quantization precision value is higher, and shorter if the quantization precision value is lower.

16. A signal decoding method, comprising the steps of:

inputting a codestring comprising variable-length codes of quantized spectral signal components, quantization precision information and normalization coefficient information, wherein the quantization precision is higher when the quantized values are larger and lower where the quantized values are smaller, and wherein the codelengths are longer if the quantization precision value is higher and shorter if the quantization precision value is lower;

extracting the codes of spectral signal components from the codestring;

separating the codes of spectral signal components from codes of the quantization precision information and the normalization coefficient information;

decoding the spectral signal components using the quantization precision information and the normalization precision information;

transforming the spectral signal components from the frequency domain to the time domain; and outputting the result.

17. A signal encoding apparatus for encoding acoustic waveform signals, comprising:

means for inputting time domain signals;

means for transforming an input signal to a frequency spectrum of signal components;

means for splitting the signal components of the frequency spectrum into a plurality of frequency subbands, means for quantizing the signal components in each subband to generate quantized values;

means for determining the quantization precision needed for the signal components of each subband, wherein the quantization precision is determined to be higher where the quantized values are larger and lower where the quantized values are smaller;

means for encoding the quantized values in variable-length codes, wherein the code lengths are set to be longer if the quantization precision value is higher, and shorter if the quantization precision value is lower; and means for outputting any of the data generated by the foregoing means.

18. The signal encoding apparatus of claim 17, further comprising:

means for calculating the total number of bits necessary for minimizing the total quantization error energy in each subband;

means for comparing the total number of bits necessary for minimizing the total quantization error energy in each subband to the total number of available bits; and means for setting the range of subband-based signal components which have a short code length to be larger than if the subband-based signal components are quantized in such a manner as to reduce the total quantization error energy in each frequency subband only if the total number of bits necessary for minimizing the total quantization error energy in each subband is larger than the total number of available bits.

19. The signal encoding apparatus of claim 17, further comprising:

means for selecting a normalizing coefficient; and means for normalizing the signal components of each subband prior to the operation of the means for quantizing.

20. The signal encoding apparatus of claim 19, wherein the means for normalizing, quantizing, determining quantization precision and encoding begin their operation in a highest-frequency subband.

21. The signal encoding apparatus of claim 19, wherein the means for selecting selects a normalizing coefficient which approximates the maximum absolute value of the spectral signal component of each subband.

22. The signal encoding apparatus of claim 17, wherein the signal components are spectral signal components obtained by converting the input signal from the time domain to the frequency domain.

23. The signal encoding apparatus of claim 17, wherein the input signal is an acoustic signal.

24. The signal encoding apparatus of claim 23, wherein the means for splitting splits the frequency subbands such that the frequency subbands are narrower in the low frequency ranges and broader in the high frequency ranges, to take into account the psychoacoustic characteristics of human hearing.

25. The signal encoding apparatus of claim 17, wherein the means for encoding produces a higher ratio of shorter to longer codelengths than if the subband-based signal components are quantized in such a manner as to minimize the total quantization error energy in each subband.

26. The signal encoding apparatus of any one of claims 17 through 24, further comprising a means for modulating the output signal so that the output signal can be recorded on a recording medium.

27. The signal encoding apparatus of any one of claims 17 through 24, further comprising a means for modulating the output signal so that the output signal can be transmitted over a transmission medium.

28. A signal encoding apparatus for encoding acoustic signals, comprising:

an input terminal for inputting time domain signals;

a conversion circuit for transforming an input signal to a frequency spectrum of signal components and splitting the signal components into a plurality of frequency subbands;

a signal component encoding circuit for quantizing the signal components in each subband to generate quantized values and for determining the quantization precision needed for the signal components of each subband, wherein the quantization precision is determined to be higher where the quantized values are larger and lower where the quantized values are smaller;

a codestring generating circuit for encoding the quantized values in variable-length codes, wherein the code lengths are set to be longer if the quantization precision value is higher, and shorter if the quantization precision value is lower; and an output terminal for outputting any of the data generated by the conversion circuit, the signal component encoding circuit or the codestring generating circuit.

29. The signal encoding apparatus of claim 28, wherein the conversion circuit comprises:

a band-splitting filter; and two forward orthogonal transform circuits.

30. The signal encoding apparatus of claim 28, wherein the encoding circuit comprises:

a normalizing circuit, for normalizing the spectral signal components from one subband to another; and a quantization precision decision circuit, which quantizes the normalized values based on the quantization precision, as computed from the spectral signal components.

31. The signal encoding apparatus of claim 28, wherein the signal component encoding circuit comprises:

a quantization error energy calculating circuit for calculating the total number of bits necessary for minimizing the total quantization error energy in each subband;

a comparing circuit for comparing the total number of bits necessary for minimizing the total quantization error energy in each subband to the total number of available bits; and a range setting circuit for setting the range of subband-based signal components which have a short code length to be larger than if the subband-based signal components are quantized in such a manner as to reduce the total quantization error energy in each frequency subband only if the total number of bits necessary for minimizing the total quantization error energy in each subband is larger than the total number of available bits.

32. The signal encoding apparatus of claim 28, wherein the signal component encoding circuit comprises:
- a normalization coefficient selection circuit for selecting a normalizing coefficient; and
- a normalizing circuit for normalizing the signal components of each subband prior to the operation of the means for quantizing.

33. The signal encoding apparatus of claim 32, wherein the signal component encoding circuit begins its operation in a highest-frequency subband.

34. The signal encoding apparatus of claim 32, wherein the signal component encoding circuit selects a normalizing coefficient which approximates the maximum absolute value of the spectral signal component of each subband.

35. The signal encoding apparatus of claim 28, wherein the signal components are spectral signal components obtained by converting the input signal from the time domain to the frequency domain.

36. The signal encoding apparatus of claim 28, wherein the input signal is an acoustic signal.

37. The signal encoding apparatus of claim 36, wherein the conversion circuit splits the frequency subbands such that the frequency subbands are narrower in the low frequency ranges and broader in the high frequency ranges, to take into account the psychoacoustic characteristics of human hearing.

38. The signal encoding apparatus of claim 28, wherein the signal component encoding circuit produces a higher ratio of shorter to longer codelengths than if the subband-based signal components are quantized in such a manner as to minimize the total quantization error energy in each subband.

39. The signal encoding apparatus of any one of claims 28 through 37, further comprising a modulating circuit for modulating the output signal so that the output signal can be recorded on a recording medium.

40. The signal encoding apparatus of any one of claims 28 through 37, further comprising a modulating circuit for modulating the output signal so that the output signal can be transmitted over a transmission medium.

41. A signal decoding apparatus, comprising:
- means for inputting a codestring comprising variable-length codes of quantized spectral signal components, quantization precision information and normalization coefficient information, wherein the quantization precision is higher when the quantized values are larger and lower where the quantized values are smaller, and wherein the codelengths are longer if the quantization precision value is higher and shorter if the quantization precision value is lower;
- means for extracting codes of spectral signal components from the codestring and separating the spectral signal components from codes of the quantization precision information and the normalization coefficient information;
- means for decoding the spectral signal components using the quantization precision information and the normalization precision information;
- means for transforming the spectral signal components from the frequency domain to the time domain; and
- means for outputting the decoded signal.

42. A signal decoding apparatus, comprising:
- an input terminal for inputting a codestring comprising variable-length codes of quantized spectral signal components, quantization precision information and normalization coefficient information, wherein the quantization precision is higher when the quantized values are larger and lower where the quantized values are smaller, and wherein the codelengths are longer if the quantization precision value is higher and shorter if the quantization precision value is lower;
- a codestring resolution circuit, in which codes of spectral signal components are extracted from the codestring and separated from codes of the quantization precision information and the normalization coefficient information;
- a signal component decoding circuit which decodes the spectral signal components using the quantization precision information and the normalization precision information;
- an inverse transform circuit which transforms the spectral signal components from the frequency domain to the time domain; and
- an output terminal.

* * * * *